United States Patent
Smethurst

(10) Patent No.: US 8,053,999 B2
(45) Date of Patent: Nov. 8, 2011

(54) HID BALLAST

(75) Inventor: Christopher John Smethurst, Leeds (GB)

(73) Assignee: Harvard Engineering PLC, Leeds (GB)

( * ) Notice: Subject to any disclaimer, the term of this patent is extended or adjusted under 35 U.S.C. 154(b) by 0 days.

(21) Appl. No.: 11/793,248

(22) PCT Filed: Dec. 2, 2005

(86) PCT No.: PCT/GB2005/004611
§ 371 (c)(1),
(2), (4) Date: May 12, 2008

(87) PCT Pub. No.: WO2006/064182
PCT Pub. Date: Jun. 22, 2006

(65) Prior Publication Data
US 2008/0252228 A1    Oct. 16, 2008

(30) Foreign Application Priority Data

Dec. 17, 2004    (GB) .................................. 0427682.0

(51) Int. Cl.
*H05B 37/02* (2006.01)
(52) U.S. Cl. ........................ 315/225; 315/224; 315/291
(58) Field of Classification Search .............. 315/209 R, 315/219, 224–225, 291, DIG. 7; 363/17, 363/56.01, 56.02, 98, 132
See application file for complete search history.

(56) References Cited

U.S. PATENT DOCUMENTS

| 4,725,762 | A | | 2/1988 | Jagschitz |
| 5,371,440 | A | | 12/1994 | Liu et al. |
| 5,434,479 | A | * | 7/1995 | Ohnishi et al. ............ 315/209 R |
| 5,844,374 | A | * | 12/1998 | Ettes et al. ................. 315/209 R |
| 5,962,981 | A | * | 10/1999 | Okude et al. .................. 315/128 |
| 6,020,691 | A | | 2/2000 | Sun et al. |
| 6,124,682 | A | | 9/2000 | Lakin et al. |
| 6,380,694 | B1 | | 4/2002 | Uchihashi et al. |
| 6,426,597 | B2 | * | 7/2002 | Rast et al. ...................... 315/219 |
| 7,061,187 | B2 | * | 6/2006 | Moisin ......................... 315/224 |
| 2001/0002781 | A1 | * | 6/2001 | Kim .............................. 315/211 |
| 2002/0030451 | A1 | * | 3/2002 | Moisin ......................... 315/219 |
| 2003/0025466 | A1 | * | 2/2003 | Ludorf .......................... 315/291 |

(Continued)

FOREIGN PATENT DOCUMENTS

DE    19523750    1/1997

(Continued)

OTHER PUBLICATIONS

International Search Report and Written Opinion of the International Searching Authority for corresponding PCT Application No. PCT/GB2005/004611.

(Continued)

*Primary Examiner* — Douglas W Owens
*Assistant Examiner* — Tung X Le
(74) *Attorney, Agent, or Firm* — Klarquist Sparkman, LLP

(57) ABSTRACT

A method and apparatus are disclosed for providing current to a load. The apparatus includes a full or half bridge switching circuit, including at least one switching element for supplying power to a load when switched on and means for switching a state of the switching element only at a time when a substantially zero voltage is applied across the switching element.

16 Claims, 6 Drawing Sheets

U.S. PATENT DOCUMENTS

| | | | |
|---|---|---|---|
| 2003/0102818 A1* | 6/2003 | Shen | 315/291 |
| 2004/0007992 A1 | 1/2004 | Ribarich | |
| 2004/0070352 A1* | 4/2004 | Shen | 315/291 |
| 2005/0041439 A1 | 2/2005 | Jang et al. | |
| 2006/0049777 A1* | 3/2006 | Kumagai et al. | 315/224 |

FOREIGN PATENT DOCUMENTS

| | | |
|---|---|---|
| JP | 2002-151286 | 5/2002 |
| JP | 2004-260882 | 9/2004 |

OTHER PUBLICATIONS

Redl, et al., "Optimum ZVS Full-Bridge DC/DC Converter with PWM Phase-Shift Control: Analysis, Design Considerations, and Experimental results," Applied Power Electronics Conference and Exposition, Conference Proceedings, pp. 159-165, 1994.

Japanese Patent Office, "Decision of Rejection" for corresponding Japanese Patent Application No. 2007-546158, Jun. 21, 2011, 6 pages.

* cited by examiner

HID BALLAST

CROSS REFERENCE TO RELATED APPLICATIONS

This is the U.S. National Stage of International Application No. PCT/GB2005/004611, filed Dec. 2, 2005, which in turn claims the benefit of Great Britain Application No. 0427682.0, filed Dec. 17, 2004.

The present invention relates to power control apparatus for providing electric power from a utility to desired voltage and current characteristics for a load. In particular, but not exclusively, the present invention relates to a method and apparatus for providing current to a high intensity discharge lamp via a lamp ballast with reduced power loss.

There are many known circumstances when power should be provided to a load. Under such circumstances the power supplied to a load must be strictly controlled so that thresholds in that load are met but not exceeded. One example of a load is a lamp. High intensity discharge lamp are one variety of lamp.

High intensity discharge (HID) lamps have been available for a number of years and consist of a sealed, usually double envelope inside which a plasma discharge takes place. The discharge ionises the gas which will emit light at various wavelengths depending on the composition of the gas within the discharge envelope.

To obtain maximum life, efficient energy conversion and safe operation requires close control of the lamp operating conditions both during start up and running. During the starting phase an initial high voltage, up to several kilo volts must be applied across the lamp to start the discharge. The power and current into the lamp must then be closely controlled until it reaches its normal hot running conditions. As the lamp moves from the start-up mode of operation to the normal running phase of operation both the voltage across the lamp and impedance of the lamp vary markedly. Any ballast used to run the lamp must take this into account.

Early passive ballasts consisted of an inductor in series with the supply that crudely limited the current into the lamp as shown in FIG. 1. The impedance of the inductor L1 is selected to be large in comparison to the effective lamp impedance so that changes in the lamp characteristics during operation and over its life have a reduced effect on the lamp current. A capacitor C1 is required on the input to bring the power factor (PF) closer to unity as the inductor forces the current to lag by 90 degrees. In addition an igniter circuit I1 is required to provide the high voltage to strike the lamp initially.

Due to the large sizes of L1, C1, I1, losses in L1 and problems of maintaining good PF over the operating voltage range and lifetime of the ballast the industry has moved to active electronic solutions.

Current electronic solutions can be exemplified by U.S. Pat. No. 4,725,762 by Otto Jagschitz. This is illustrated in FIG. 2.

Here a full bridge circuit is used for a dual purpose to generate a high frequency resonant voltage to strike the lamp and a low frequency, controlled current during the run condition.

In normal operation Q3 and Q4 are turned on and off at a suitable low frequency such that when Q3 is on Q4 is off and visa versa. If Q3 is on then Q1 is off always off and similarly if Q4 is on then Q2 is always off. Assuming that Q3 is on, then Q2 is alternately turned on and off (Pulse Width Modulated PWM) at a higher frequency than Q3 and Q4 to control the current through the load. As any current flowing in L1 will be flowing in D1 before Q2 turns on, then Q2 has to commutate this current before the voltage on D2 cathode falls to zero. The sequence of Q2 turning on is shown in the waveforms of FIG. 3. At time T0 current is flowing in L1 and D1 and full voltage appears across Q2. At time T1 Q2 starts to turn on and current in it rises until at time T2 the current in Q2 equals that in L1. The current in Q2 continues to rise as D1 now conducts in the reverse direction and it starts to recover and reaches a peak at T3. By time T4 D1 has fully recovered, its current falls to zero and the voltage across Q2 now falls to a low value. As will be evident from the waveforms during the time T1 to T3, Q2 has current flowing through it and the full high voltage supply across it and so will dissipate significant energy as it turns on. The peak current that flows during this time is the sum of the current in L1 and the peak reverse recovery current in D1.

Referring to FIG. 4. At time T6 Q2 stars to turn off and the instant the current tries to reduce in L1 the voltage across it rises to the full supply and the difference in current between that flowing in L1 and Q2 flows in D1. The current continues to fall in Q2 and rise in D1 until at time T7 Q2 is off and D1 is conducting all the current in L1. From the waveforms it can be seen that Q2 has full supply voltage across it and current flowing through it from time T6 to T7 and so dissipates significant energy.

A similar situation occurs when Q4 is on and Q1 is switching with diode current in D2. This method of switching is called hard switching.

The bridge circuit can be supplied from any of a number of well known electronic pfc stages that give a suitable stable high voltage rail.

There are three main areas where the prior art is deficient.

1) Hard switching in the full bridge switches leads to increased power losses as noted above; also 2) The hard switching leads to the generation of electromagnetic interference (EMI) that has to be suppressed by filtering within the ballast; also 3) Current ripple in the lamp is significant due to the single stage filter formed by L1 and C1.

It is an aim of the present invention to at least partly mitigate the above-mentioned problems.

It is an aim of embodiments of the present invention to provide apparatus which may be in the form of circuitry for controlling current applied to a load so that the current in the load meets required thresholds but does not exceed predetermined thresholds.

It is an aim of embodiments of the present invention to provide a lamp ballast and a method for operating a lamp ballast in which the switching status of switching elements is switched only at times when a zero or minimal voltage is applied across a switching element. Power losses are thus much reduced.

According to a first aspect of the present invention there is provided power control apparatus for providing current to a load, comprising:

a full/half bridge switching circuit including at least one switching element for supplying power to a load when switched on; and means for switching a state of said switching element only at a time when a substantially zero voltage is applied across said switching element.

According to a second aspect of the present invention there is provided a method for providing current in a load, comprising the steps of:

in a normal mode of operation, providing a low frequency controlled current to said load via a power control apparatus including a full/half bridge switching circuit; and switching state in at least one switching element in said full/half bridge switching circuit only when a substantially zero voltage is applied to the switching element.

Embodiments of the present invention provide the advantage that the switching elements in lamp ballast circuitry are switched only under a zero voltage condition so that power dissipated is reduced compared to prior art ballast.

Embodiments of the present invention will now be described, by way of example only, with reference to the accompanying drawings in which.

The invention combines the functions of a current source with zero voltage switching (ZVS) whilst preserving the resonant strike function into one full bridge power conversion stage, reducing power losses, ripple current in the lamp, EMI and improving efficiency.

Whilst the specifically described embodiments are described with respect to lamp ballast it will be understood that embodiments of the present invention are generally applicable to power control for the application to loads of varying types.

The switches Q1-4 are shown as bipolar devices but could equally be mos-fets or any other type of electronic switch. The diode D1 and capacitor C3 could be part of the switch Q1 or separate. If C3 is part of the switching element it may be augmented by additional capacitance in parallel. Similarly with Q2, D2, C4 and Q3, Q4 and D3, D4.

Figure 1:
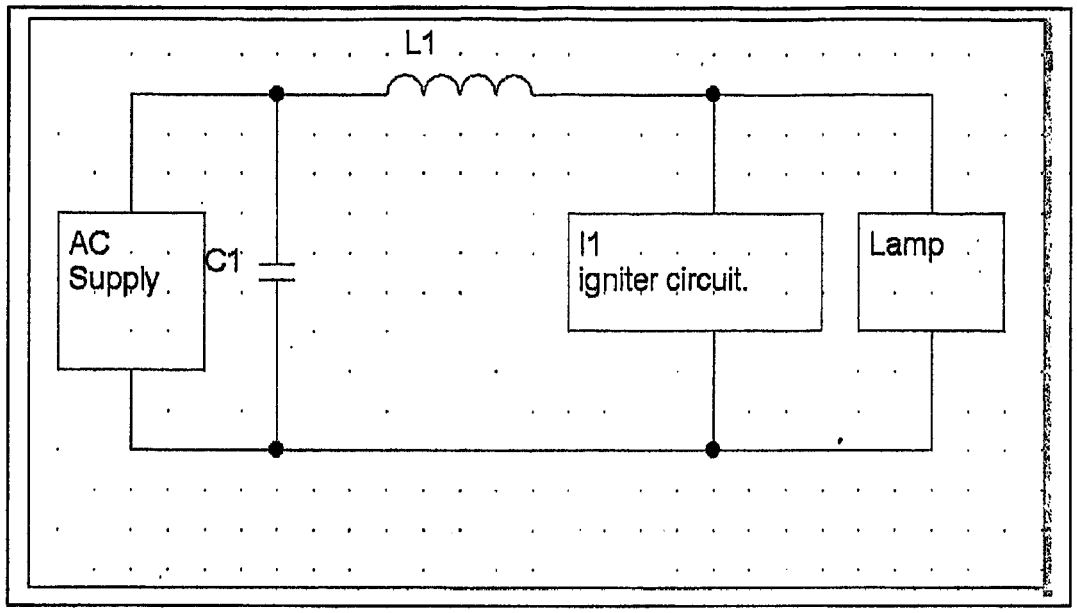
FIG. 1 illustrates a prior art ballast.
Figure 2:
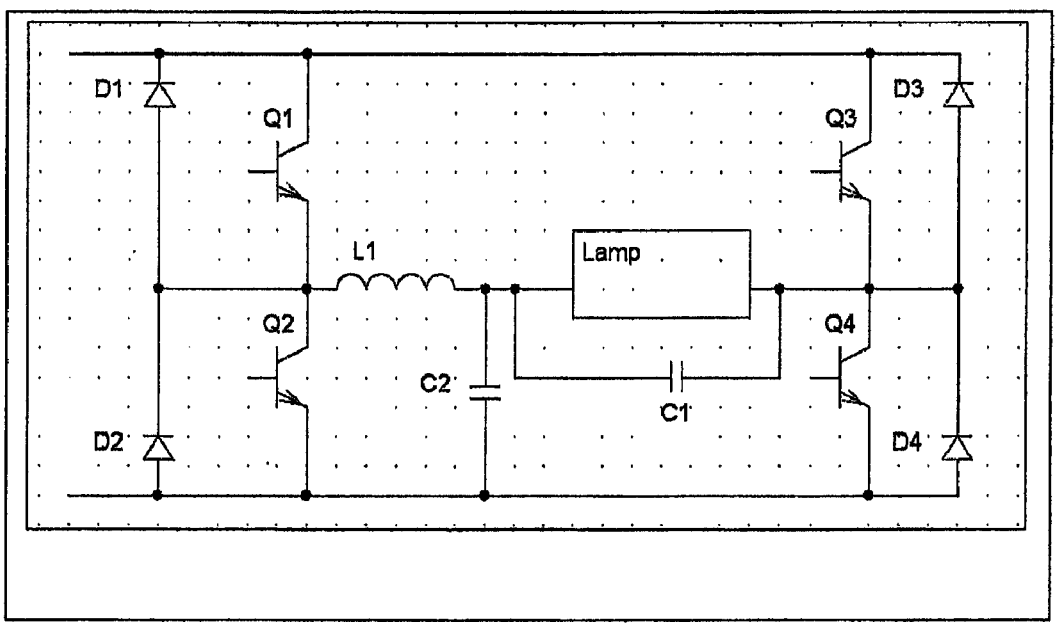
FIG. 2 illustrates another prior art ballast.
Figure 3:
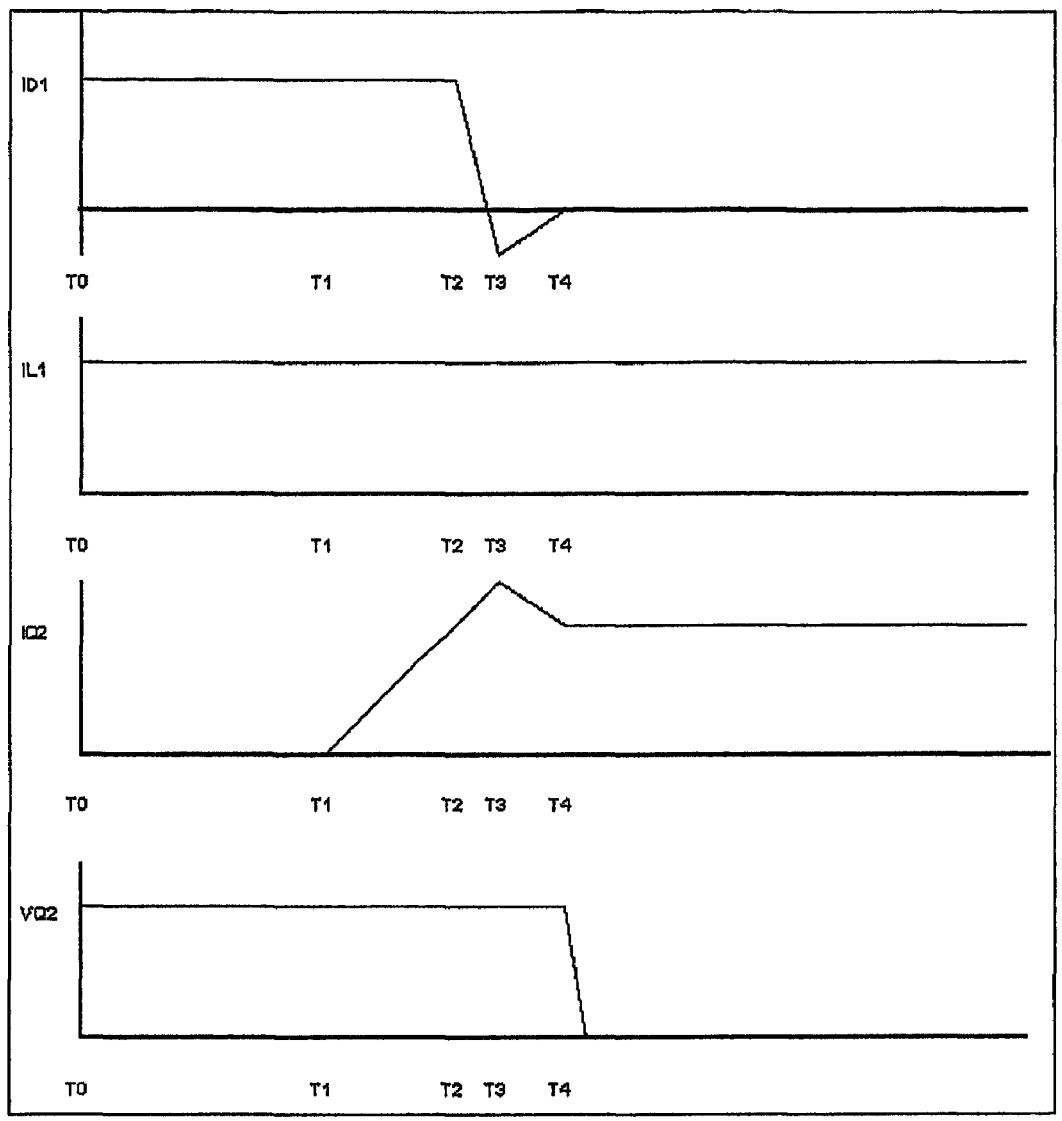
FIG. 3 illustrates the response of parts of the prior art circuit.
Figure 4:
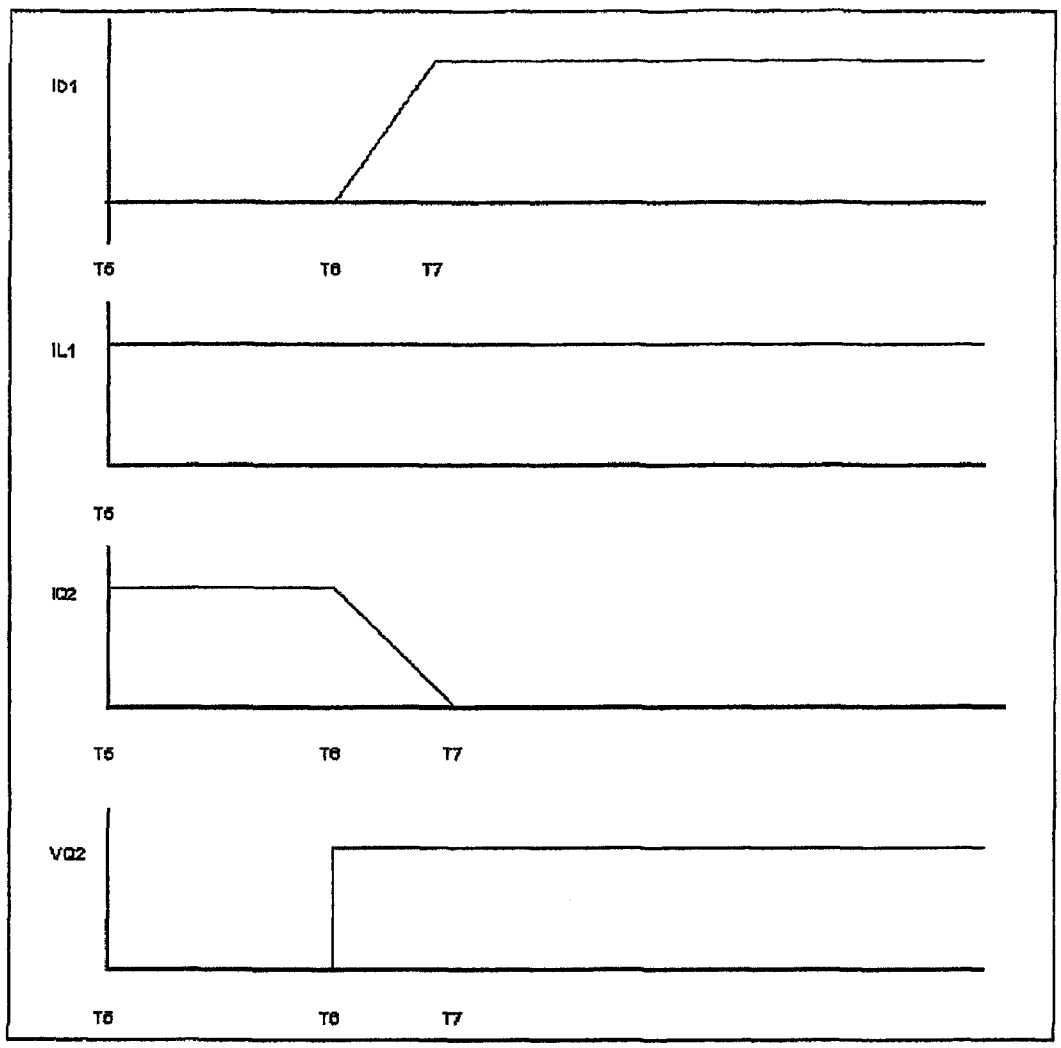
FIG. 4 illustrates the response at parts of the prior art circuitry.
Figure 5:
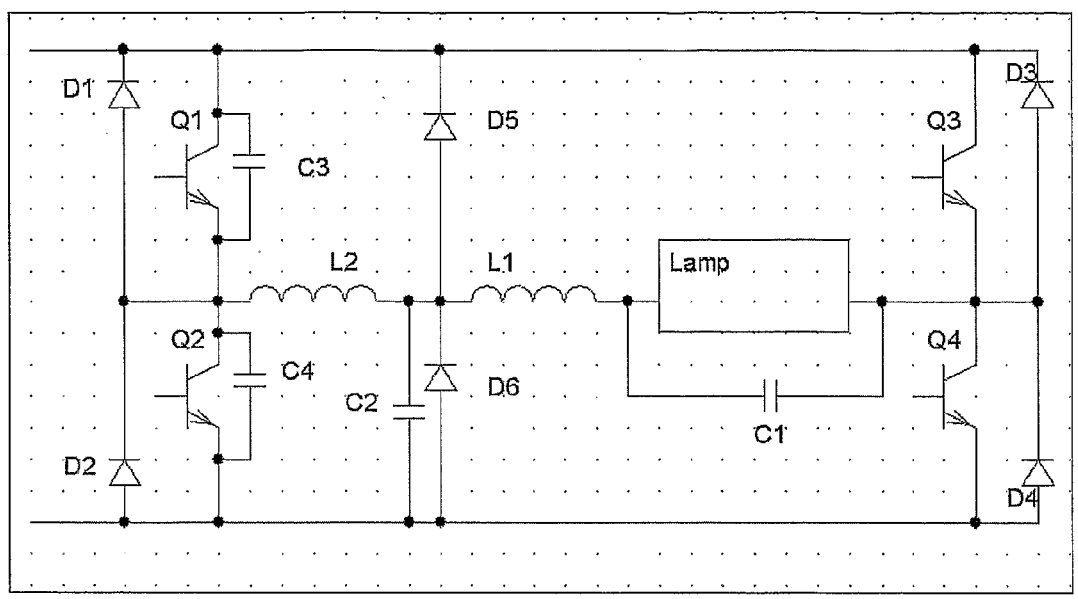
FIG. 5 illustrates a lamp ballast according to an embodiment of the present invention.

With reference to FIG. 5. During normal operation Q3 and Q4 are turned on alternately at a low frequency. When Q3 is on Q4 is off and visa versa. At the time that Q3 is turned on Q2 is turned on and off by pulse width modulation (PWM) using ZVS in such a way as to maintain the current in the lamp substantially constant. Q1 is turned off for all the time that Q3 is on in this mode. The value of C2 is such that its voltage does not change substantially during the time that it takes for Q2 to turn on or off. The ZVS action is described as follows with reference to the waveforms in FIG. 6 and FIG. 7.

Figure 6:
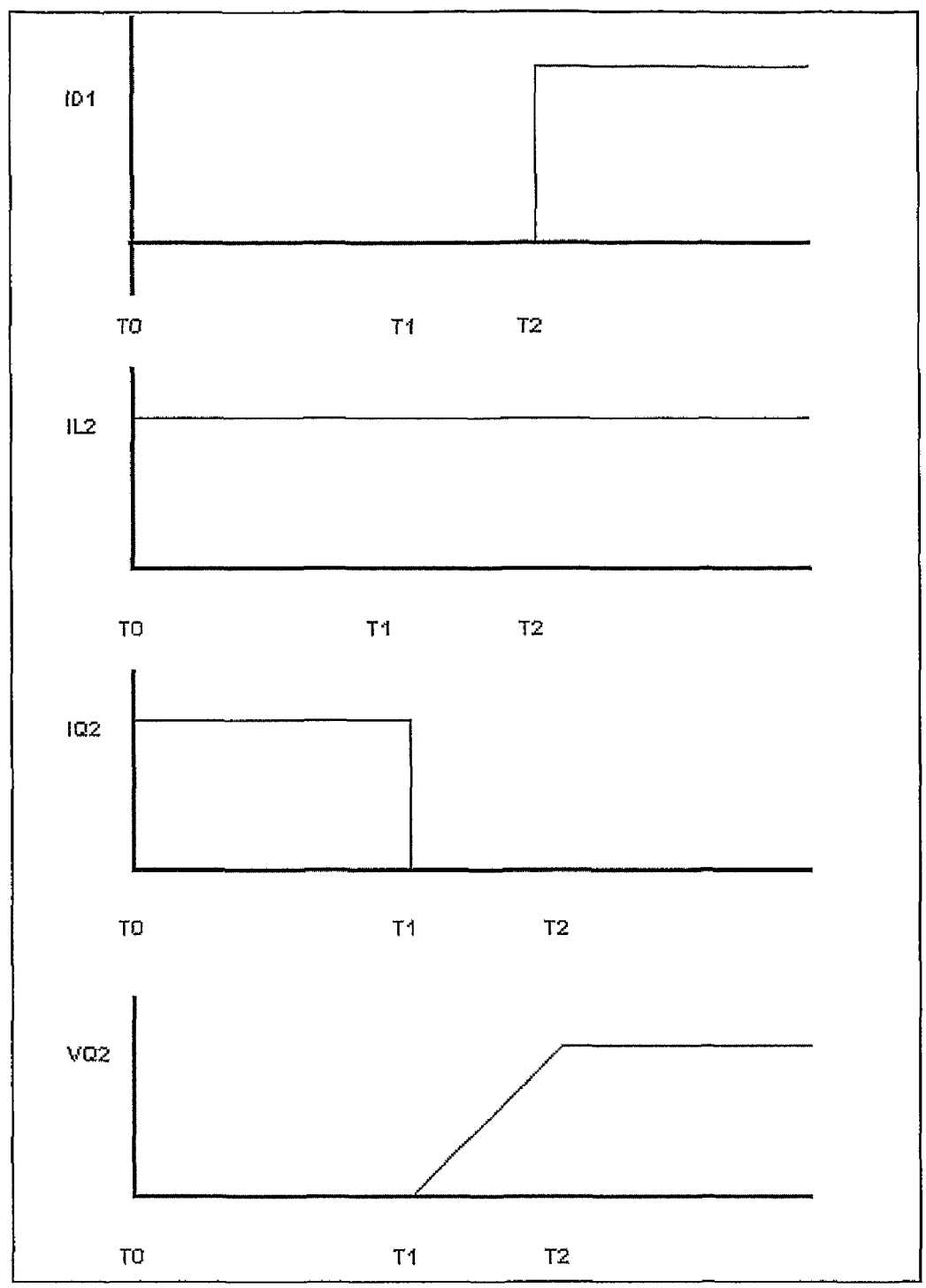
FIG. 6 illustrates timings and development of other parameters.

For Q2 turn off assume that Q3 and Q2 are on and the current has risen in Q2 and L2, time T0 in FIG. 6. When it reaches a preset value determined by the control Q2 is turned off at time T1 and the voltage across it starts to rise as the current in L2 charges the combined capacitance of C3 and C4. The combined values of C3 and C4 limit the rate of rise of voltage across Q2. When the voltage reaches the supply rail D1 conducts. L2 now discharges its stored energy into C2 and the current flows through D1 until the current in L2 reaches zero at which point D1 stops conducting.

Figure 7:
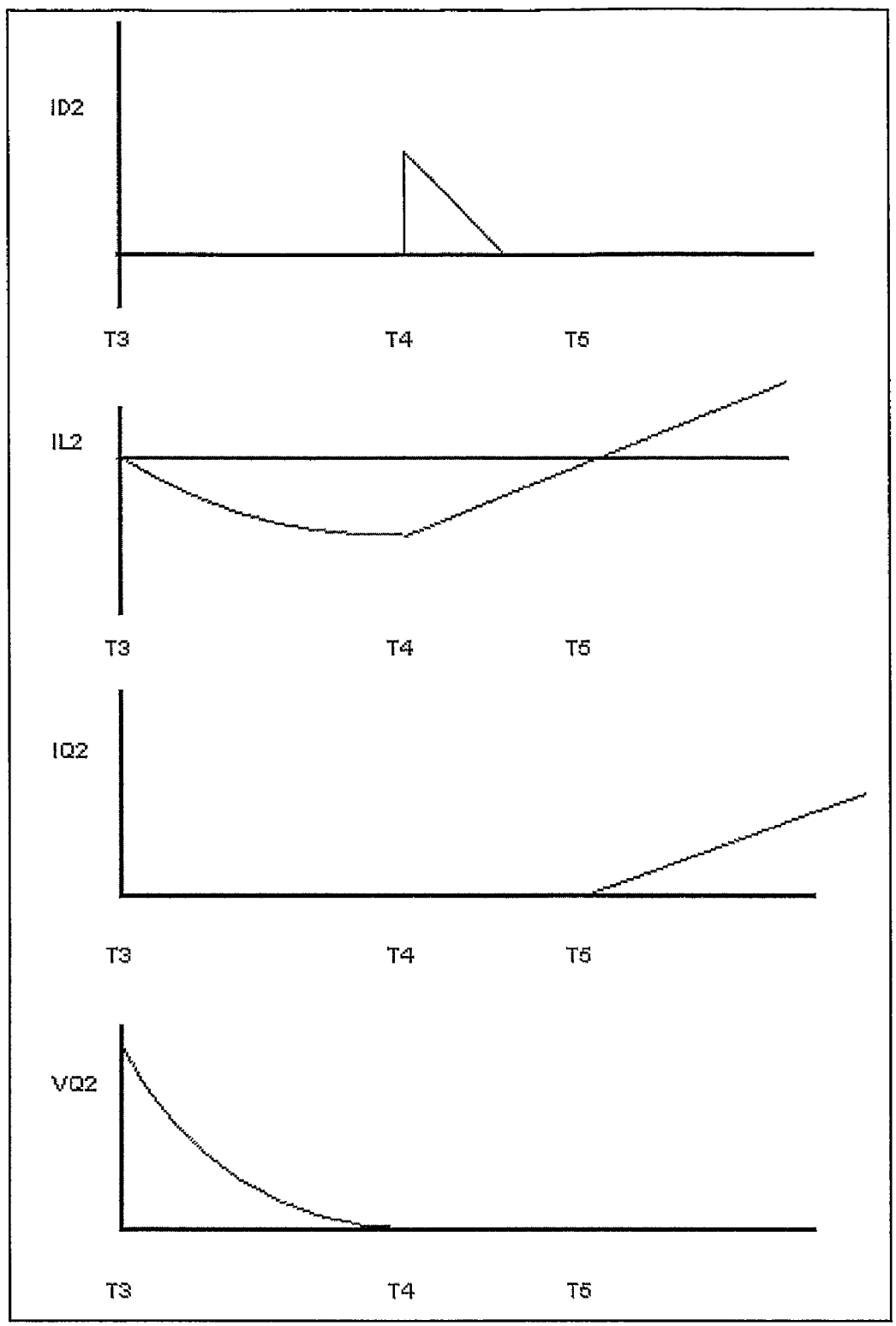
FIG. 7 illustrates the development of certain parameters in the circuit of FIG. 5.

With reference to FIG. 7. The current in L2 now reverses at time T3 as D1 recovers and it does a resonant ring with the combined capacitance of C3 and C4 and the voltage across Q2 falls until it reaches zero at time T4 when D2 conducts. The control then switches Q2 on again and the cycle repeats as long as Q3 is on.

When Q3 turns off and Q4 turns on then Q1 is turned on and off in the same manner as was Q2 and Q2 is turned off for all the time that Q4 is on. In this way Q1 and Q2 are turned on and off with substantially zero volts across them and so have minimal switching losses. It is clear that the rate at which the voltage changes across the switches is determined by C3, C4 and L2 and so can be optimised by changing these values for EMI and/or power loss.

The circuit of FIG. 5 contains an extra LC filter stage compared to the prior art and as such leads to reduced current ripple in the lamp and reduces the chances of acoustic arc resonance caused by such excessive ripple currents.

During start up and striking of the lamp Q1 and Q2 are driven alternately at high frequency in order to cause L1/C1 to resonate and generate the necessary high voltage across the lamp to cause it to strike.

Alternatively Q3 and Q4 may be driven at high frequency either on their own or in conjunction with Q1 and Q2 to cause L1/C1 to resonate and generate the high voltage to start the lamp.

After the lamp discharge is initiated the operation of Q1 and Q2 progresses to the normal running condition previously described to control the lamp current.

Embodiments of the present invention have been described in which the status, that is whether a switch is on or off, is changed only at a point in time when the voltage across a switching element is substantially zero or much reduced. In this way power dissipated by the device is controlled.

Embodiments of the present invention have been described hereinabove by way of example only. It will be understood that modifications may be made without departing from the scope of the present invention. In particular it will be understood that embodiments of the present invention can be used with a half bridge arrangement.

The invention claimed is:

1. Power control apparatus for providing current to a lamp, comprising:
    a full/half bridge switching circuit including two first switching elements connected in series between high and low power supplies, each one of the two first switching elements for supplying power to the lamp when a respective first switching element is switched on;
    means for switching a state of each said first switching element only at a time when a substantially zero voltage is applied across said first switching element;
    first and second inductive elements, a node between the two first switching elements being connected to a first lamp terminal via the first and second inductive elements; and
    a capacitor connected in parallel with said lamp between the first lamp terminal and a second lamp terminal and arranged to provide a resonant circuit together with the first inductive element connected to the first lamp terminal to strike the lamp during a start-up mode of operation;
    wherein said apparatus comprises a lamp ballast and said full/half bridge switching circuit comprises a full bridge switching circuit; and
    wherein said full bridge switching circuit comprises two diagonal pairs of switching elements each pair comprising one of said first switching elements arranged to repeatedly switch on and off when a remaining switching element in the pair is on and to remain off when said remaining switching element is off.

2. The power control apparatus as claimed in claim 1 wherein the two remaining switching elements are connected in series and between the high and low power supplies.

3. The power control apparatus as claimed in claim 2 wherein the lamp is connected via the second lamp terminal to a node between said remaining switching elements.

4. The power control apparatus as claimed in claim 1 further comprising a capacitor element arranged in parallel with each first switching element.

5. The power control apparatus as claimed in claim 4 wherein each first switching element comprises a MOSFET and said capacitor element comprises a parasitic capacitance of said MOSFET.

6. The power control apparatus as claimed in claim 5 further comprising a further capacitor connected in parallel with the parasitic capacitance of said MOSFET.

7. The power control apparatus as claimed in claim 4 wherein each first switching element comprises a bipolar device and said capacitor element comprises a discrete capacitor connected in parallel with the said first switching element .

8. The power control apparatus as claimed in claim 1 further comprising a diode element in parallel with each of the first switching elements.

9. The power control apparatus as claimed in claim 8 wherein said first switching element comprises a MOSFET and said diode element comprises a parasitic diode of said MOSFET.

10. The power control apparatus as claimed in claim 9 further comprising a further diode element connected in parallel with the parasitic diode of said MOSFET.

11. The power control apparatus as claimed in claim 8 wherein said first switching element comprises a bipolar device and said diode element comprises a discrete diode connected in parallel with each said first switching element.

12. The power control apparatus as claimed in claim 1 further comprising:
first and second diodes connected in series between the high and low power supplies, a node between the first and second diodes being connected to a node between said first and second inductive elements.

13. The power control apparatus of claim 1, wherein the node between the two first switching elements, the second inductive element, the first inductive element, and the first lamp terminal are connected in series, in that order, the first inductive element being connected directly to the first lamp terminal.

14. The power control apparatus of claim 1, wherein the resonant circuit is independent of the second inductive element.

15. Power control apparatus for providing current to a lamp, comprising:
a full/half bridge switching circuit including two first switching elements connected in series between high and low power supplies, each one of the two first switching elements for supplying power to the lamp when a respective first switching element is switched on;
means for switching a state of each said first switching element only at a time when a substantially zero voltage is applied across said first switching element;
first and second inductive elements, a node between the two first switching elements being connected to a first lamp terminal via the first and second inductive elements;
a capacitor connected in parallel with said lamp between the first lamp terminal and a second lamp terminal and arranged to provide a resonant circuit together with the first inductive element connected to the first lamp terminal to strike the lamp during a start-up mode of operation; and
a capacitor connected between the low power supply and a node between the first and second inductive elements.

16. A method for providing current in a lamp, comprising the steps of:
in a normal mode of operation, providing a low frequency controlled current to said lamp via a power control apparatus including a full/half bridge switching circuit comprising two first switching elements connected in series between high and low power supplies, a node between the two first switching elements being connected to a first lamp terminal via first and second inductive elements;
switching state in each said first switching element in said full/half bridge switching circuit only when a substantially zero voltage is applied across said first switching element; and
striking the lamp via a resonance circuit comprising a capacitor connected in parallel with said lamp between the first lamp terminal and a second lamp terminal and the first inductive element connected to the first lamp terminal during a start-up mode of operation,
wherein said full/half bridge switching circuit comprises a full bridge switching circuit and said power control apparatus comprises a lamp ballast,
the method further comprising the steps of:
providing control signals to two pairs of diagonal switching elements of said full bridge switching circuit, each pair of switching elements comprising one of the first elements, to selectively turn said switching element on and off; whereby
the first switching element in each pair is switched on according to a zero voltage switching sequence only when a remaining switching element in the pair is on.

* * * * *